US011419385B2

(12) United States Patent
Hancock

(10) Patent No.: US 11,419,385 B2
(45) Date of Patent: Aug. 23, 2022

(54) KNITTED COMPONENT FOR AN ARTICLE OF FOOTWEAR

(71) Applicant: NIKE, Inc., Beaverton, OR (US)

(72) Inventor: Walter M. Hancock, Taichung (TW)

(73) Assignee: NIKE, Inc., Beaverton, OR (US)

( * ) Notice: Subject to any disclaimer, the term of this patent is extended or adjusted under 35 U.S.C. 154(b) by 273 days.

(21) Appl. No.: 15/994,030

(22) Filed: May 31, 2018

(65) Prior Publication Data

US 2018/0343973 A1 Dec. 6, 2018

Related U.S. Application Data

(60) Provisional application No. 62/513,105, filed on May 31, 2017.

(51) Int. Cl.
*A43B 1/04* (2022.01)
*D04B 1/26* (2006.01)
(Continued)

(52) U.S. Cl.
CPC ............ *A43B 1/04* (2013.01); *A43B 23/0265* (2013.01); *A43B 23/042* (2013.01); *D04B 1/108* (2013.01);
(Continued)

(58) Field of Classification Search
CPC ......... A43B 1/04; A43B 23/025; A43B 23/04; A43B 23/042; D04B 1/26
See application file for complete search history.

(56) References Cited

U.S. PATENT DOCUMENTS

| 4,149,323 A | * | 4/1979 | Roy | .................... A43B 23/0295 36/48 |
| 5,345,638 A | * | 9/1994 | Nishida | .................... A41H 3/08 12/146 C |

(Continued)

FOREIGN PATENT DOCUMENTS

| CN | 105530827 A | 4/2016 |
| CN | 105636470 A | 6/2016 |

OTHER PUBLICATIONS

Office Action in Europe Application No. 18731328.3, dated Jan. 24, 2020, including International Search Report and Written Opinion from Application PCT/US2018/034895, dated Sep. 4, 2018, 16 pages.

(Continued)

*Primary Examiner* — Megan E Lynch
(74) *Attorney, Agent, or Firm* — Shook Hardy & Bacon LLP

(57) ABSTRACT

A knitted component may include a first portion, where the first portion at least partially forms an underfoot area of an article of footwear. A second portion may be included, where the second portion at least partially forms an outer surface of a medial or a lateral side of an article of footwear. A forward portion may extend from an end of the first portion and may include a toebox area in a toe region of the knitted component. A knitted connection structure may be located between the toebox area of the forward portion and the second portion, where the second portion includes a first course, where the toebox area of the second portion includes a second course, and where the first course is secured to the second course through the knitted connection structure.

9 Claims, 8 Drawing Sheets

(51) Int. Cl.
  *A43B 23/02* (2006.01)
  *D04B 1/10* (2006.01)
  *A43B 23/04* (2006.01)
  *D04B 1/24* (2006.01)
(52) U.S. Cl.
  CPC .............. *D04B 1/24* (2013.01); *D04B 1/26* (2013.01); *D10B 2501/043* (2013.01)

(56) References Cited

U.S. PATENT DOCUMENTS

| | | | | |
|---|---|---|---|---|
| 5,604,997 | A * | 2/1997 | Dieter | A43B 23/042 12/146 C |
| 8,595,878 | B2 | 12/2013 | Huffa et al. | |
| 9,611,571 | B2 * | 4/2017 | Ikenaka | D04B 1/22 |
| 2005/0081402 | A1 * | 4/2005 | Orei | A43B 7/06 36/45 |
| 2005/0115284 | A1 * | 6/2005 | Dua | A43B 23/042 66/178 R |
| 2005/0193592 | A1 * | 9/2005 | Dua | A43B 23/042 36/45 |
| 2008/0110048 | A1 * | 5/2008 | Dua | D04B 1/22 36/45 |
| 2008/0110049 | A1 * | 5/2008 | Sokolowski | D04B 1/22 36/50.1 |
| 2012/0011744 | A1 * | 1/2012 | Bell | A43B 23/07 36/91 |
| 2012/0266362 | A1 * | 10/2012 | Craig | A41B 11/005 2/239 |
| 2013/0318822 | A1 * | 12/2013 | Wang | A43B 23/042 36/83 |
| 2014/0137434 | A1 * | 5/2014 | Craig | A43B 23/0215 36/54 |
| 2014/0245632 | A1 * | 9/2014 | Podhajny | A43B 23/042 36/45 |
| 2014/0245633 | A1 | 9/2014 | Podhajny | |
| 2014/0338226 | A1 | 11/2014 | Zavala | |
| 2014/0352173 | A1 * | 12/2014 | Bell | A43B 23/0245 36/50.1 |
| 2015/0082836 | A1 * | 3/2015 | Riaz | D04B 1/26 66/187 |
| 2016/0029736 | A1 | 2/2016 | Meir | |
| 2016/0066651 | A1 * | 3/2016 | Terai | D04B 1/24 36/45 |
| 2016/0120233 | A1 * | 5/2016 | Van Tiel | A41B 11/121 2/239 |
| 2016/0198798 | A1 * | 7/2016 | Ikenaka | D04B 1/22 36/45 |
| 2017/0188661 | A1 * | 7/2017 | Lee | A43B 23/0245 |
| 2017/0215523 | A1 * | 8/2017 | Nishiwaki | A43B 7/08 |
| 2017/0273406 | A1 * | 9/2017 | Kilgore | A43B 23/025 |
| 2017/0303600 | A1 * | 10/2017 | Van Tiel | D04B 1/26 |
| 2017/0370027 | A1 | 12/2017 | Da Costa Pereira Machado et al. | |
| 2018/0042340 | A1 * | 2/2018 | Kuo | A43B 23/042 |
| 2018/0199668 | A1 * | 7/2018 | Yumiba | A43B 23/26 |
| 2018/0255863 | A1 * | 9/2018 | Kuo | D04B 1/24 |
| 2018/0255864 | A1 * | 9/2018 | Kuo | A43B 23/0255 |

OTHER PUBLICATIONS

International Search Report dated Sep. 4, 2018 for PCT Application No. PCT/US2018/034895, 3 pages.
International Preliminary Report on Patentability and Written Opinion dated Dec. 12, 2019 for PCT Application No. PCT/US2018/034895, 8 pages.

* cited by examiner

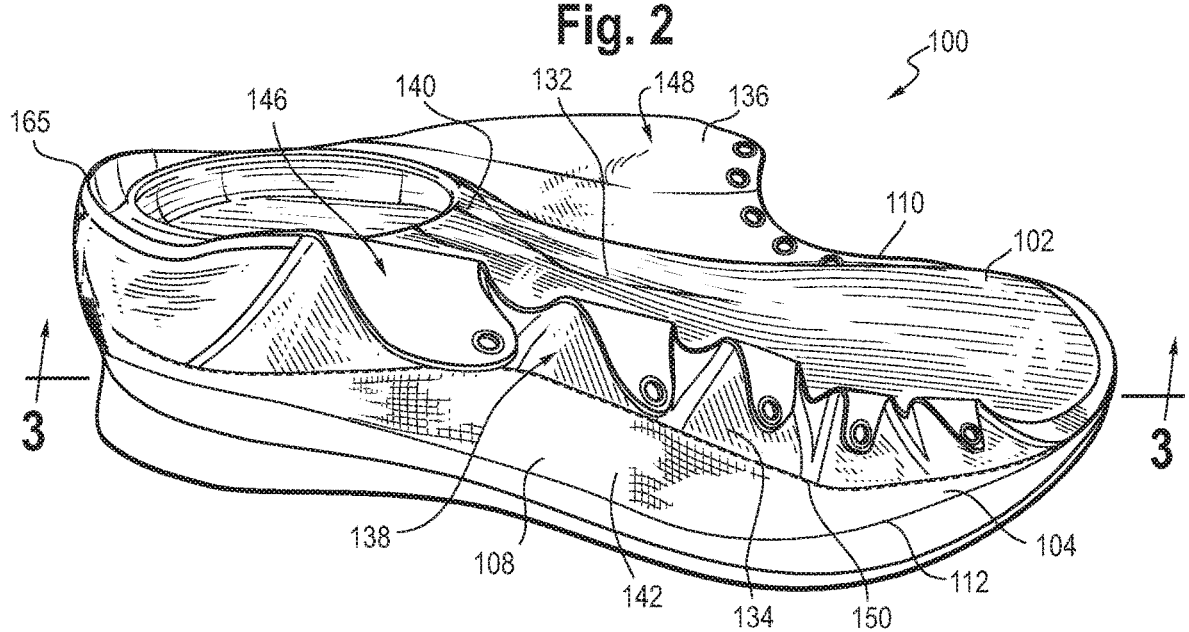
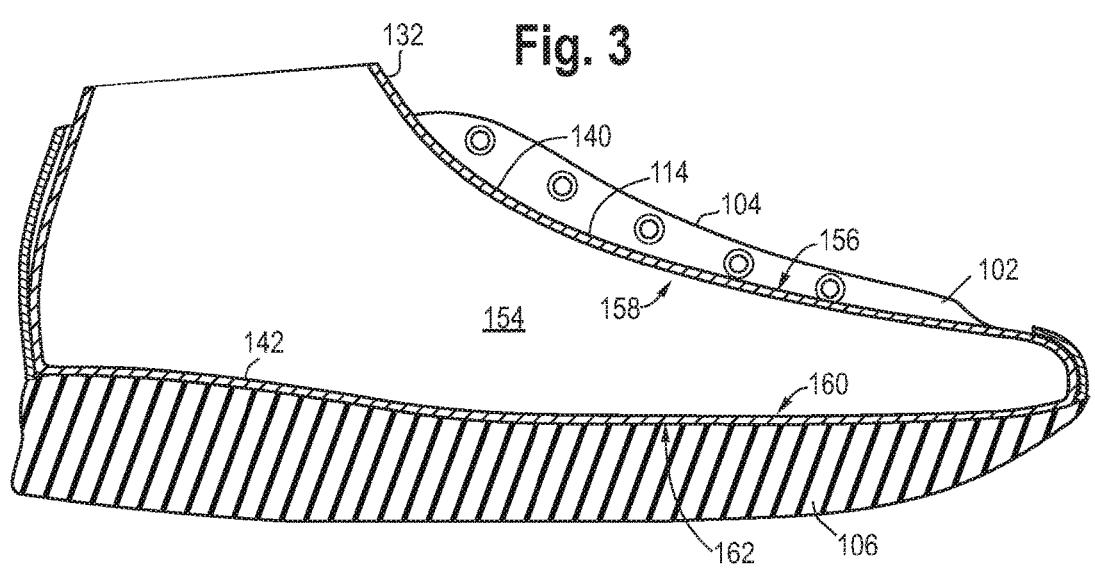

KNITTED COMPONENT FOR AN ARTICLE OF FOOTWEAR

RELATED MATTERS

This application claims the benefit of U.S. Provisional Application No. 62/513,105, filed May 31, 2017, which is hereby incorporated by reference in its entirety.

BACKGROUND

Conventional articles of footwear generally include two primary elements: an upper and a sole structure. The upper is secured to the sole structure and forms a void within the article of footwear for comfortably and securely receiving a foot. The sole structure is secured to a lower surface of the upper so as to be positioned between the upper and the ground. In some articles of footwear, the sole structure may include a midsole and an outsole. The midsole may be formed from a polymer foam material that attenuates ground reaction forces to lessen stresses upon the foot and leg during walking, running, and other ambulatory activities. The outsole may be secured to a lower surface of the midsole and forms a ground-engaging portion of the sole structure that is formed from a durable and wear-resistant material.

The upper of the article of footwear generally extends over the instep and toe areas of the foot, along the medial and lateral sides of the foot, and around the heel area of the foot. An ankle opening in a heel area generally provides access to the void in the interior of the upper. A lacing system is often incorporated into the upper to adjust the fit of the upper, thereby facilitating entry and removal of the foot from the void within the upper. The upper may include a tongue that extends under the lacing system to enhance adjustability of the footwear, and the upper may incorporate a heel counter to limit movement of the heel.

BRIEF SUMMARY

One general aspect of the present disclosure includes a knitted component with a first portion, where the first portion at least partially forms an underfoot area of an article of footwear. A second portion may be included, where the second portion at least partially forms an outer surface of a medial or a lateral side of an article of footwear. A forward portion may extend from an end of the first portion and may share at least one common knit structure with the first portion, where the forward portion includes a toebox area in a toe region of the knitted component. A knitted connection structure may be located between the toebox area of the forward portion and the second portion, where the second portion includes a first course, where the toebox area of the second portion includes a second course being different then the first course, and where the first course is secured to the second course through the knitted connection structure.

Another general aspect of the present disclosure includes a knitted component with a first portion, where the first portion at least partially forms an underfoot area of an article of footwear, and a second portion extending from at least one of a medial and lateral side of the first portion and sharing a common knit structure with the first portion. A forward portion may extend from a toe region of the first portion and may include a toebox area, where the forward portion shares a common knit structure with the first portion. A knitted connection structure may secure at least one course of the forward portion to at least one course of the second portion such that the toebox area curves to form an overfoot are of the knitted component.

Another general aspect of the present disclosure includes a method. The method may include knitting a first portion of a knitted component, where the first portion at least partially forms an underfoot area of an article of footwear. The method may further include knitting a second portion of the knitted component, where the second portion at least partially forms an outer surface at least at a medial or a lateral side of the article of footwear, and where the second portion includes a first course. The method may further include knitting a forward portion that extends from the first portion and includes a toebox area in a toe region of the article of footwear, where the toebox area includes a second course. The method may further include forming a knitted connection structure securing the first course to the second course.

BRIEF DESCRIPTION OF THE DRAWINGS

FIG. 2 is an illustration showing a second lateral side view of the article of footwear of FIG. 1, where certain portions are in a spread or opened configuration to showcase certain features.

FIG. 3 is an illustration showing a sectional view of the article of footwear of FIG. 2 taken along line 3-3.

DETAILED DESCRIPTION

Figure 1:
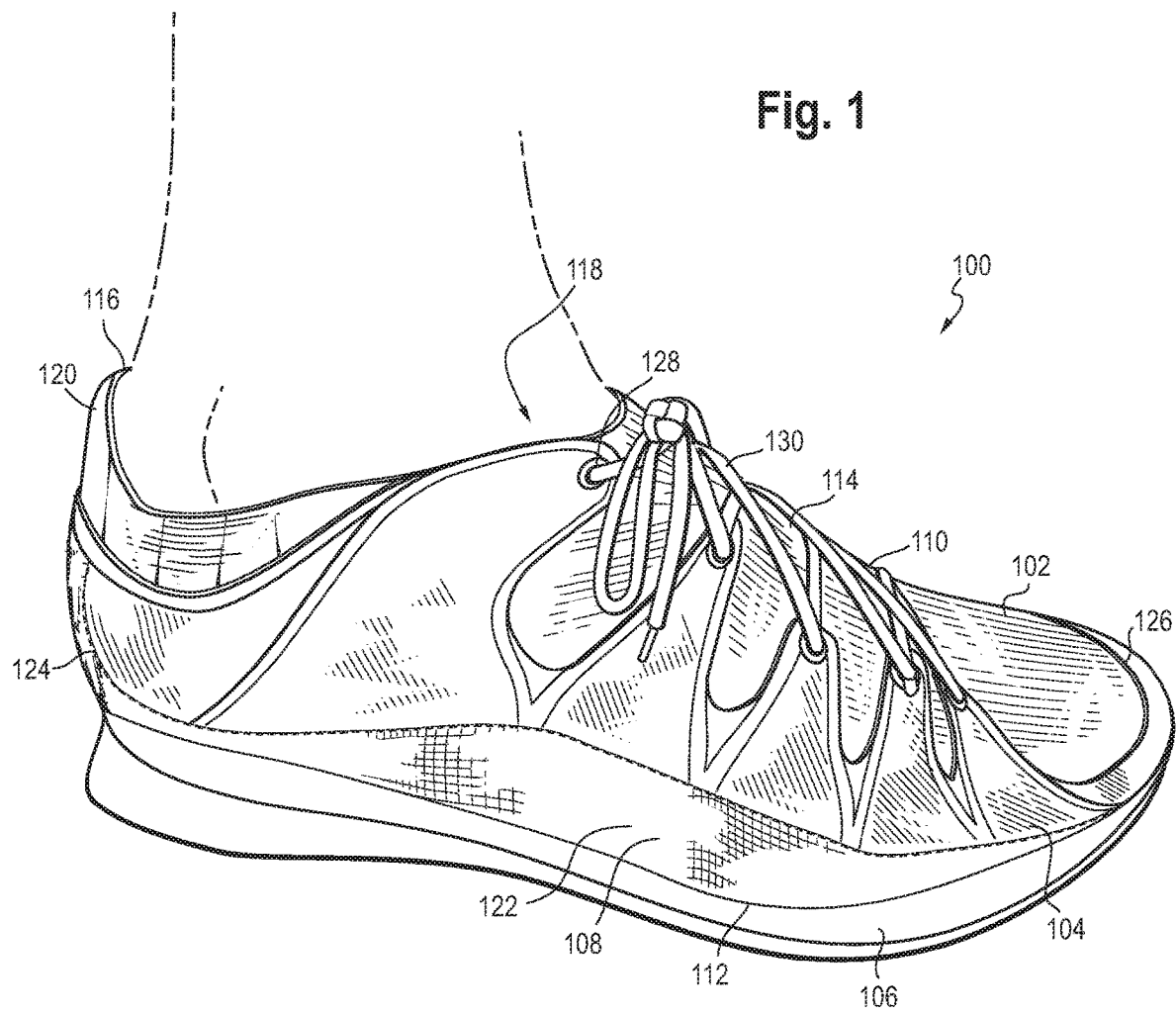
FIG. 1 is an illustration showing a lateral side view of an article of footwear in accordance with the present disclosure.

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale, and in certain instances details may have been omitted that are not necessary for an understanding of aspects disclosed herein, such as conventional fabrication and assembly.

Certain aspects of the present disclosure relate to uppers configured for use in an article of footwear and/or other articles, such as article of apparel. When referring to articles of footwear, the uppers may be used in connection with any type of footwear. Illustrative, non-limiting examples of articles of footwear include a basketball shoe, a biking shoe, a cross-training shoe, a global football (soccer) shoe, an American football shoe, a bowling shoe, a golf shoe, a hiking shoe, a ski or snowboarding boot, a tennis shoe, a running shoe, and a walking shoe. The uppers may also be incorporated into non-athletic shoes, such as dress shoes, loafers, and sandals.

FIG. 1 is an illustration showing an article of footwear 100 formed with an upper 102, where the upper 102 is substantially formed as a textile component. The textile component may be any suitable type of textile, and in some embodiments it may be formed as a knitted component 104. As shown, the knitted component 104 may be secured to a sole structure 106. The upper 102 may include a lateral side 108 and a medial side 110. The area where the sole structure 106 joins the upper 102 may be referred to as a biteline 112. The upper 102 may be joined to the sole structure 106 in a fixed manner using any suitable technique, such as through the use of an adhesive, by sewing, etc. The upper 102 may extend partially or completely around a foot of a wearer and/or may be integral with the sole structure 106, and a sockliner may or may not be used. In some embodiments, the sole structure 106 may include a midsole (not shown) and an outsole.

The upper 102 may additionally include a throat area 114 extending from and the ankle opening 116 leading to the void 118, and a collar 120 may at least partially surround an ankle opening 116. The void 118 of the article of footwear 100 may be configured (e.g., sized and shaped) to receive and accommodate a foot of a person. The throat area 114 may be generally disposed in a midfoot area 122 of the upper 102. The midfoot area 122 of the upper 102 may be located between a heel area 124 and a toe area 126. In some embodiments, an optional tongue (such as the tongue shown in FIG. 6) may be disposed at least partially in the throat area 114. The tongue may be any type of tongue, such as a gusseted tongue or a burrito tongue. If a tongue is not included (or in combination with a tongue), the lateral and medial sides of the throat area 114 may be joined together.

The article of footwear 100 may include a fastening element. Any suitable type of fastening element may be used, such as the depicted lace 130, a cable-tensioning system, and/or any other suitable device. The upper 102 may be configured to secure to and communicate with the fastening element such that the fastening element may adjust and/or tighten the upper 102 around a foot of a wearer. For example, the upper 102 may include a set of apertures 128 for receiving the fastening element, but other suitable element(s) may alternatively be used.

At least a portion of the upper 102, and potentially the entirety of the upper 102, may be formed of the knitted component 104 (or another suitable textile component). The knitted component 104 may be formed as an integral one-piece element during a knitting process, such as a weft knitting process (e.g., with a flat knitting machine or circular knitting machine), a warp knitting process, or any other suitable knitting process. That is, the knitting process on the knitting machine may substantially form the knit structure of the knitted component 104 without the need for significant post-knitting processes or steps. Alternatively, two or more portions of the knitted component 104 may be formed separately as distinct integral one-piece elements and then the respective elements attached.

Forming the upper 102 with the knitted component 104 may provide the upper 102 with advantageous characteristics including, but not limited to, a particular degree of elasticity (for example, as expressed in terms of Young's modulus), breathability, bendability, strength, moisture absorption, weight, abrasion resistance, and/or a combination thereof. These characteristics may be accomplished by selecting a particular single layer or multi-layer knit structure (e.g., a ribbed knit structure, a single jersey knit structure, or a double jersey knit structure), by varying the size and tension of the knit structure, by using one or more yarns formed of a particular material (e.g., a polyester material, a relatively inelastic material, or a relatively elastic material such as spandex), by selecting yarns of a particular size (e.g., denier), and/or a combination thereof. The weight of the knitted component 104, and thus the overall weight of the article of footwear 100, may be reduced with respect to alternative components typically used in footwear. The knitted component 104 may also provide desirable aesthetic characteristics by incorporating yarns having different colors, textures or other visual properties arranged in a particular pattern. The yarns themselves and/or the knit structure formed by one or more of the yarns of the knitted component 104 may be varied at different locations such that the knitted component 104 has two or more portions with different properties (e.g., a portion forming the throat area 114 of the upper 102 may be relatively elastic while another portion may be relatively inelastic). In some embodiments, the knitted component 104 may incorporate one or more materials with properties that change in response to a stimulus (e.g., temperature, moisture, electrical current, magnetic field, or light). For example, the knitted component 104 may include yarns formed of a thermoplastic polymer material (e.g., a polyurethane, polyamide, polyolefin, and/or nylon) that transitions from a solid state to a softened or liquid state when subjected to certain temperatures at or above its melting point and then transitions back to the solid state when cooled. The thermoplastic polymer material may provide the ability to heat and then cool a portion of the knitted component 104 to thereby form an area of bonded or continuous material (herein referred to as a "fused area") that exhibits certain advantageous properties including a relatively high degree of rigidity, strength, and water resistance, for example.

FIG. 2 is an illustration showing a second lateral side view of the article of footwear 100 of FIG. 1. In FIG. 2, the upper 102 is depicted without a lace or other fastening element and with certain portions spread out from their typical wearable configurations to showcase certain features of the knitted component 104. As shown, a first portion 132 of the knitted component 104 may be located between a second portion 134 and a third portion 136. In some embodiments, the first portion 132, the second portion 134, and/or the third portion 136 may be formed together on a knitting machine such that they share a common yarn, a common loop, a common course, a common wale, and/or another common knit structure. Thus, the first portion 132 may be secured to the second portion 134 via at least one knit structure of the knitted component 104 (such as a common course, a common wale, a common loop, and/or a common yarn), and similarly the first portion 132 may be secured to the third portion 136 via at least one knit structure of the knitted component 104. Advantageously, no post-knitting step may be necessary for connecting the respective portions of the knitted component, which may save material cost and manufacturing time thereby decreasing the end cost to a consumer.

The second portion 134 and/or the third portion 136 may form an outer surface 138 of the upper 102 on at least one of the lateral side 108 and the medial side 110 of the article of footwear 100. In the embodiment of FIG. 2, for example, the second portion 134 forms at least a portion of the outer surface 138 on the lateral side 108 and the third portion 136 forms at least a portion of the outer surface 138 on the medial side 110 of the article of footwear. As shown, the second portion 134 and/or the third portion 136 may overlap the first portion 132 (i.e., the second portion 134 and the third portion 136 may be coextensive with the first portion 132 on the medial side 110 and lateral side 108, respectively). Thus, an inner surface 146 of the second portion 134 and/or an inner surface 148 of the third portion 136 may face, and potentially contact, the first portion 132 when the article of footwear 100 is in a wearable configuration.

At least one of the first portion 132, the second portion 134, and the third portion 136 of the knitted component 104 may optionally have more than one layer of knitted material. When a portion of the knitted component 104 has more than one layer, the multiple layers may be integrally formed (e.g. together during a knitting or other textile manufacturing process), or they may alternatively be separately formed and later attached. In some embodiments, the multiple layers may be formed on multiple needle beds of a knitting machine but may be integral and tightly bound together such that they are inseparable and/or are not readily distinguishable (visually or otherwise), and thus "multiple layers" is not limited to separable layers having a pocket or other space therebetween. However, in some embodiments, the multiple layers may be separable and/or otherwise movable with respect to one another and may form a pocket therebetween.

For example, as shown in FIGS. 2-3, the first portion 132 of the knitted component 104 may have two separable layers: an upper layer (depicted as the first layer 140) and a lower layer (depicted as the second layer 142). The first layer 140 and the second layer 142 may converge and secure to one another at a boundary 150 of the first portion 132. The boundary may be the point of attachment between the first layer 140 and the second layer 142, and the attachment may be provided by a common course, loop, wale, and/or yarn extending between the first layer 140 and the second layer 142. Other attachment devices and/or methods are also contemplated (e.g., the first layer 140 and the second layer 142 may be sewn together, secured via an adhesive, etc.). The boundary 150 may be located on at least one of the lateral side 108 and the medial side 110 and on the outer surface 138 (as shown in FIG. 2) such that a portion of the second layer 142 is exposed on an overfoot portion of the knitted component 104. In other embodiments, the boundary 150 may be approximately aligned with the biteline 112 and/or may be located on an underfoot portion of the knitted component 104.

When the first portion 132 has multiple layers, the first layer 140 may primarily be formed on a front needle bed of the knitting machine and the second layer 142 may primarily be formed on a back needle bed (or vice versa). If the two layers are separable and define a pocket therebetween, the layer formed on the front needle bed and/or the layer formed on the back needle bed may have a single jersey knit structure or another knit structure incorporating needles from only one bed.

Other knitting techniques may be additionally or alternatively used to form a multi-layer structure. For example, it is contemplated that both layers could utilize needles from each bed during the knitting process to enhance the ability to integrate functional and/or visual features within each layer. For example, one or more consecutive courses of the first layer 140 may utilize needles from both needle beds to provide the first layer 140 with a particular multi-bed knit structure. Then, prior to or during knitting one or more courses of the second layer 142, all loops of the first layer 140 may be transferred to a first needle bed to free the needles on the second needle bed to form the second layer 142 (and to prevent the first layer 140 from binding to the second layer 142). The second layer 142 may then be knitted on the second bed alone or may utilize needles on both needle beds (particularly if the first layer 140 leaves some needles on the first needle bed unoccupied). If the second layer 142 is formed on both beds, once it is time to resume knitting courses of the first layer 140, all loops associated with the second layer 142 may be transferred to the second bed to free the first bed for again forming the first layer 140 (and to prevent the second layer 142 from binding with the first layer 140). This process may be repeated as necessary.

If necessary, when knitting the first layer 140 and/or the second layer 142, certain needles on each bed may be skipped by the first layer 140 and/or the second layer 142 to leave needles unoccupied for knitting the other layer. Thus, the first layer 140 and/or the second layer 142 may have a reduced gauge and/or stitch density when compared to the knit structure of the second portion 134 and the third portion 136 of FIG. 2 (which are formed of a full-gauge or substantially full-gauge in exemplary embodiments). In some embodiments, a gauge of the first layer 140 and/or the second layer 142 (defined by the ratio of the number of needles used to the total number of needles available) may be at least 25% less than a gauge of the second portion 134 and/or a gauge of the third portion 136. In exemplary embodiments, the gauge of the first layer 140 (which may be relatively elastic) is about 50% or less than the gauge of the second portion 134 and the gauge of the third portion 136.

FIG. 3 is an illustration showing a sectional view of the article of footwear of FIG. 2 taken along line 2-2. As shown, the first layer 140 and the second layer 142 may each have opposite-facing surfaces, and a pocket 154 may be located between the first layer 140 and the second layer 142. That is, the first layer 140 may include a first top surface 156 and a first bottom surface 158 and the second layer 142 may include a second top surface 160 and a second bottom surface 162. The first bottom surface 158 and the second top surface 160 may face the pocket 154, and the first top surface 156 and the second bottom surface 162 may face away from the pocket 154.

In the depicted embodiment, the second layer 142 may form an underfoot portion associated with a plantar aspect of the foot (also known as the sole or bottom of a foot). The first layer 140 of the knitted component 104 may at least partially form an overfoot portion associated with the remainder of the foot, including the dorsal surface (i.e., the top of the foot), particularly in the throat area 114. As shown, the second top surface 160 may contact the plantar aspect of the foot (or sock) of a wearer during typical use, and the first bottom surface 158 may contact the dorsal surface of the foot. It is also contemplated that a liner or another component may be located between the knit surfaces and the void, but a liner is optional.

When the first layer 140 is configured to form an overfoot portion of the upper 102, it may be advantageous for the first layer 140 to have a relatively high elasticity (and thus a relatively low modulus of elasticity (Young's modulus)) such that it provides a secure, snug, and/or comfortable fit around the foot, and such that the first layer 140 has the capability of moving and/or flexing dynamically with the foot when the article of footwear experiences typical use. When the second layer 142 is configured to form an underfoot portion, the second layer 142 may be configured to secure to the sole structure 106. Thus, the second bottom surface 162 may be formed with surface characteristics suitable for facilitating attachment to the sole structure through sewing, bonding via adhesive, etc. The second layer 142 may have a relatively low elasticity (e.g., a high Young's modulus) and a relatively high strength and durability with respect to the first layer 140. The relative elasticities may be accomplished by selectively utilizing a particular knit structure (e.g., a ribbed knit structure, a single jersey knit structure, or a double jersey knit structure), by varying the size and tension of the knit structure, by using one or more yarns formed of a particular material (e.g., a polyester material, or an elastic material such as spandex) or construction (e.g., multifilament or monofilament), by selecting yarns of a particular size (e.g., denier), or a combination thereof.

The elasticity of at least one area of a knitted portion (e.g., a portion of the knitted component 104) may be determined by subjecting the area to a known amount of force and then measuring the area's elongation. For example, two respective ends of the area may be inserted into grips on measuring arms of an extensometer, the area may be subjected to a known stretching force (i.e., tensile force), and then the deformation may be measured. The modulus of elasticity may then be calculated by determining the force needed to achieve a given amount of deformation. In embodiments where the second layer 142 has a low elasticity (and thus high modulus of elasticity) relative to the first layer 142, for example, an area of the second layer 142 may deform less relative to an area with the same dimensions of the first layer 140 when both areas are subjected to the same amount of stretching force. In one non-limiting method of measuring elasticity, the applied stretching force may be about 5 pounds, but other stretching forces are also contemplated (e.g., 1 pound or less, 10 pounds, 20 pounds, 50 pounds, etc.).

Figure 4:
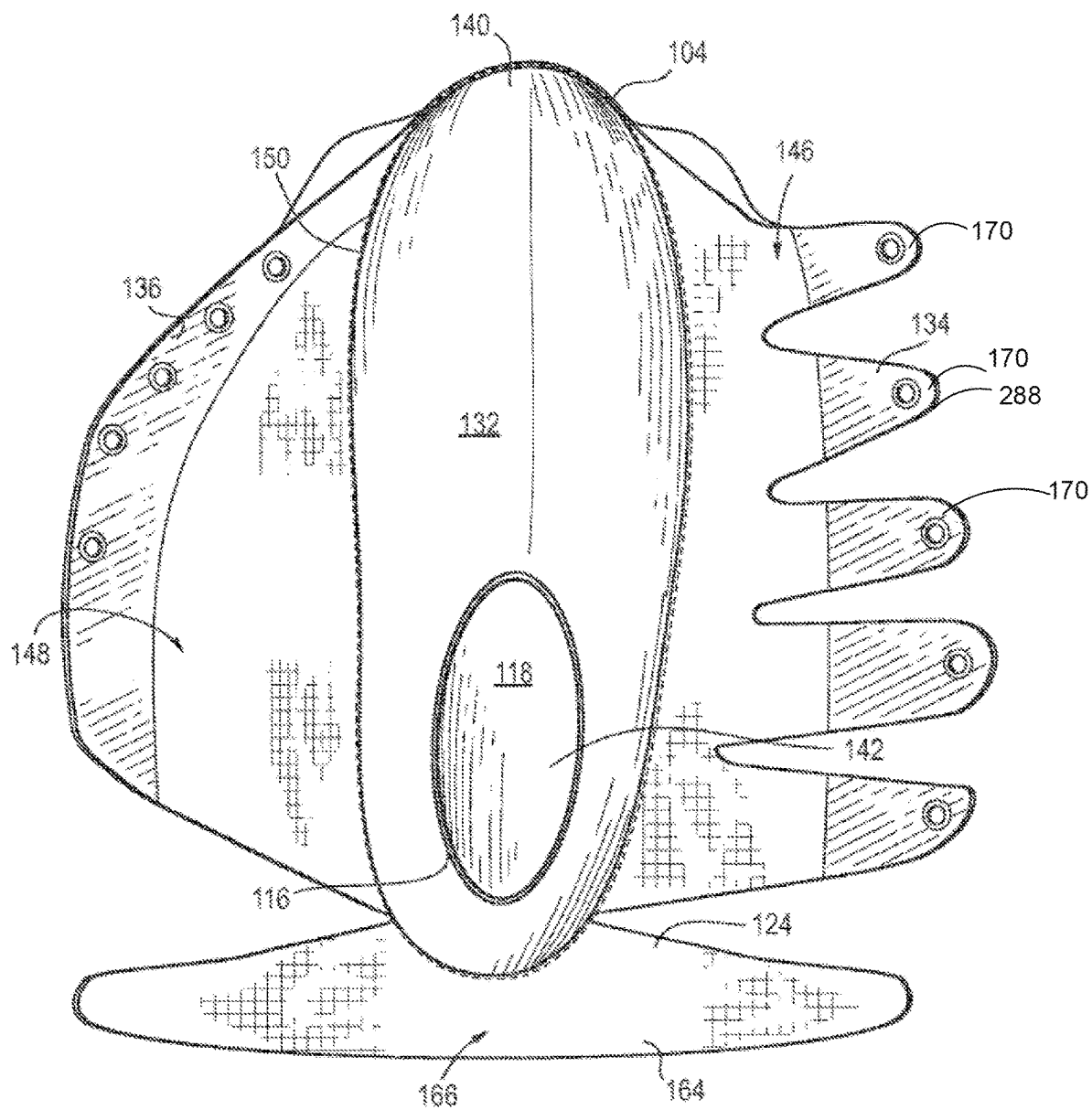
FIG. 4 is an illustration showing the knitted component for the article of footwear of FIGS. 1-3 as it may appear after a knitting process.

FIG. 4 is an illustration showing the knitted component for the article of footwear of FIGS. 1-3 as it may appear after a knitting process. As shown, the ankle opening 116 may be provided in the first layer 140. The ankle opening 116 may be formed on the knitting machine when knitting the knitted component 104 (e.g., by skipping needles where the ankle opening 116 is located), or it may be formed during a post-processing step (e.g., cutting). If the first layer 140 can be manipulated to form either an overfoot portion or an underfoot portion (as described in more detail below), it is contemplated that the ankle opening 116 may be adjustable in size (e.g., via a drawstring, via the natural elasticity of the knit structure, etc.).

As shown in FIG. 4, the second portion 134 and the third portion 136 may extend from the boundary 150 of the first portion 132. Similarly, a heel portion 164 of the knitted component 104 may extend from the boundary 150. The heel portion 164 may include a relatively rigid, strong, and/or another protective characteristic for providing suitable structure and durability in the heel area 124 article of footwear. The heel portion 164 may overlap (e.g., be coextensive with) the first portion 132 when in its wearable configuration, and in some embodiments, the heel portion 164 may be secured to at least one of the second portion 134 and the third portion 136. The securement between the heel portion 164 and the second portion 134 and/or the third portion 136 may be via a knitted connection structure 165 (shown in FIG. 2) as is described in more detail below. The heel portion 164, the second portion 134, and/or the third portion 136 may have only one layer of knitted material and/or may have multiple layers that are tightly bound together such that they are inseparable and/or are not readily distinguishable. The one-layer or bound-layer construction may provide desirable rigidity, elasticity (e.g., relatively low elasticity), durability, and other characteristics that may be deemed desirable for an outer surface of an article of footwear. In FIG. 4, the inner surface 146 of the second portion 134, and inner surface 148 of the third portion 136, and an inner surface 166 of the heel portion 164 are facing the viewer. When folded or otherwise manipulated into their wearable orientation, those respective inner surfaces of the heel portion 164, the second portion 134, and the third portion 136 may face the void 118.

The heel portion 164, the second portion 134, and/or the third portion 136 may be of a single layer (or bound multiple layers) that utilize the full capacity of two needle beds if a knitting machine when formed. As a result, the heel portion 164, the second portion 134, and/or the third portion 136 may have a relatively strong, inelastic, and durable structure that provides the knitted component 104 with suitable strength, rigidity, support, protection, and other advantageous characteristics. Thus, the heel portion 164, the second portion 134, and the third portion 136 may each have an elasticity that is less than the elasticity of the first layer 140 and/or the second layer 142 of the first portion 132. Further, the flat nature of the second portion 134 and the third portion 136 along with the ability to utilize two beds of a flat knitting machine to form the second portion 134 and the third portion 136 may enhance the ability to include certain knit features, particularly since utilizing the full capacity of two beds (instead of one) significantly increases the ability to selectively include visual designs, varying physical properties, and other features formed by a particular knit structure, particular yarn(s), or a combination thereof. To illustrate, one yarn type (e.g., a yarn with a thermoplastic polymer material composition) may be located on the outer surface 138 (see FIG. 2) of the second portion 134 and a different yarn type may be exposed on an inner surface 146 of the second portion 134 (and the same may be true of the third portion 136). The flat nature of these portions may additionally enhance the ability for post-knit processing (e.g., applying non-knit graphics, heat pressing, etc.).

Advantageously, the unique structure of the knitted component 104 depicted in FIG. 4 allows the article of footwear to have both (1) a comfortable and dynamic fit provided by the relatively high elasticity of the first layer 140 of the first portion 132 of the knitted component, and also (2) a sufficiently rigid, protective, durable, and strong outer surface 138 (FIG. 2) provided by the heel portion 164, the second portion 134, and the third portion 136.

In some embodiments, the second portion 134 and/or the third portion 136 may have a particular shape configured to enhance functional and/or visual properties of the knitted component 104. As shown in FIG. 4, the second portion 134 may be corrugated and have one or more spaces 168 between corrugations 170. This embodiment may advantageously increase heel-to-toe flexibility of the article of footwear, for example, while maintaining adequate medial-to-lateral support. The third portion 136 may include a similar construction, but this is optional. As shown, the third portion 136 covers substantially all of the medial side of the article of footwear, which may be advantageous when a high degree of stretch resistance and support is needed in that area. Any other suitable shape for the second portion 134 and the third portion 136 is contemplated.

Figure 5:
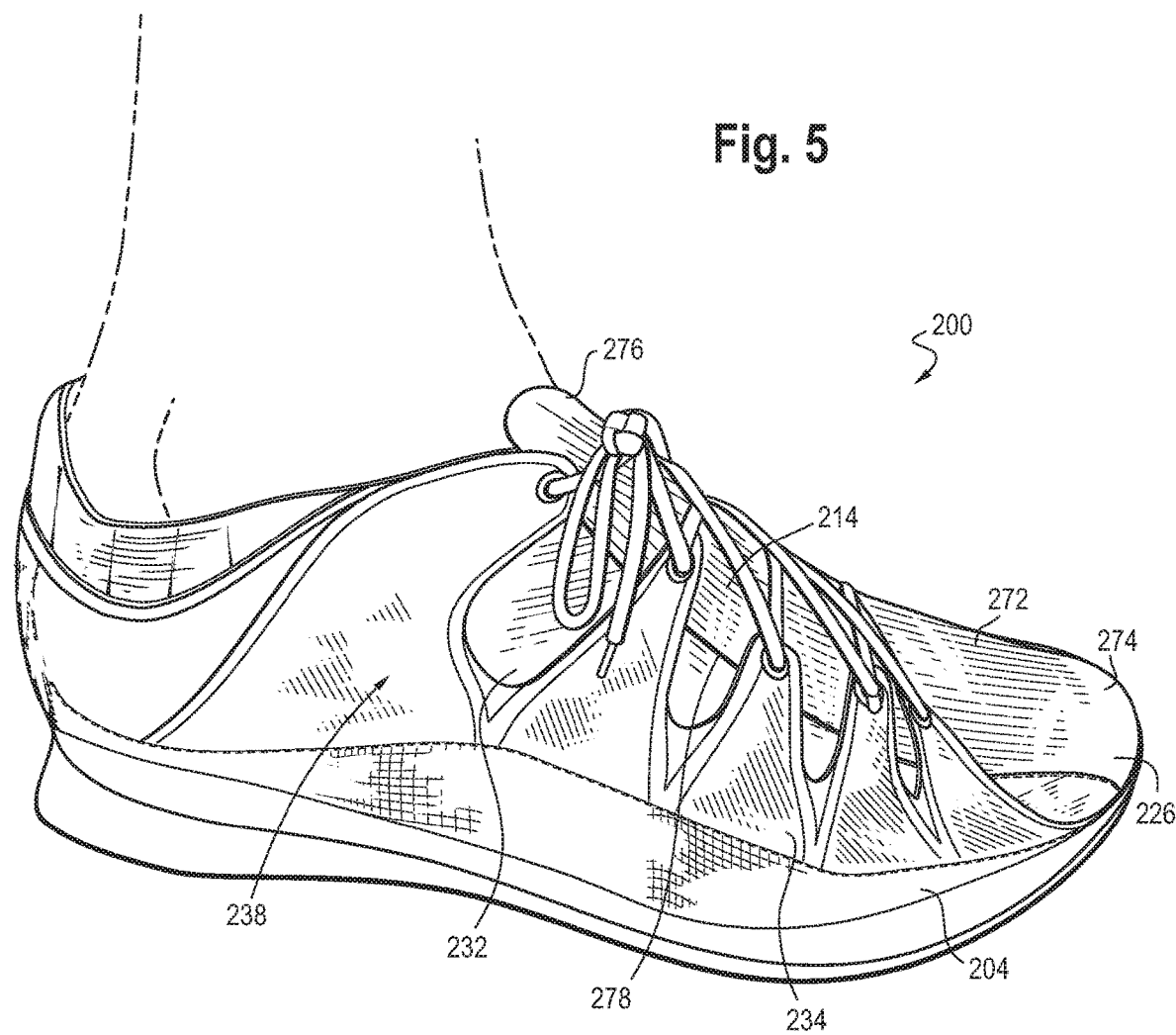
FIG. 5 is an illustration showing a lateral side view of another embodiment of an article of footwear including a knitted component in accordance with the present disclosure.

FIG. 5 is an illustration showing another embodiment of an article of footwear 200 including a knitted component 204 in accordance with the present disclosure. The knitted component 204 may be similar to the knitted component 104 described with reference to FIGS. 1-4 above, but the knitted component 204 shown in FIG. 5 may additionally include a forward portion 272 extending from a toe area 226 of a first portion 232 of the knitted component 204. The forward portion 272 may include a toebox area 274 and a tongue 276. As describe above with respect to other knitted portions, the first portion 232 may be have multiple separable layers and may be located between a second portion 234 and a third portion 236. The second portion 234 and/or the third portion 236 may form an outer surface 238 of the knitted component 204. The forward portion 272 may have one or more layers (separable or bound), and at least one portion of the forward portion 272 may primarily include a knit structure (e.g., a double jersey knit structure) utilizing two needle beds of a knitting machine (though this is optional).

The tongue 276 may extend from the toebox area 274 and over a throat area 214 when the knitted component 204 is in its wearable configuration. A lateral edge 278 of the tongue 276 may be overlapped by (i.e., at least partially coextensive with) the second portion 234, and a medial edge (not show) of the tongue 276 may be overlapped by the third portion 236 (shown in FIG. 6) when in its wearable configuration. Advantageously, the tongue 276 may be pulled by a user to facilitate entry of a foot into a void of the article of footwear, and the tongue 276 may provide additional protection to the dorsal surface of the foot. The toebox area 274 may provide additional structural characteristics and protection at the toe area 226 of the knitted component 204. The forward portion 272 may be formed on a knitting machine with the remainder of the knitted component 204 such that no post-knitting attachment step is needed, or, the forward portion 272 may be formed separate and then attached after the knitting process.

Figure 6:
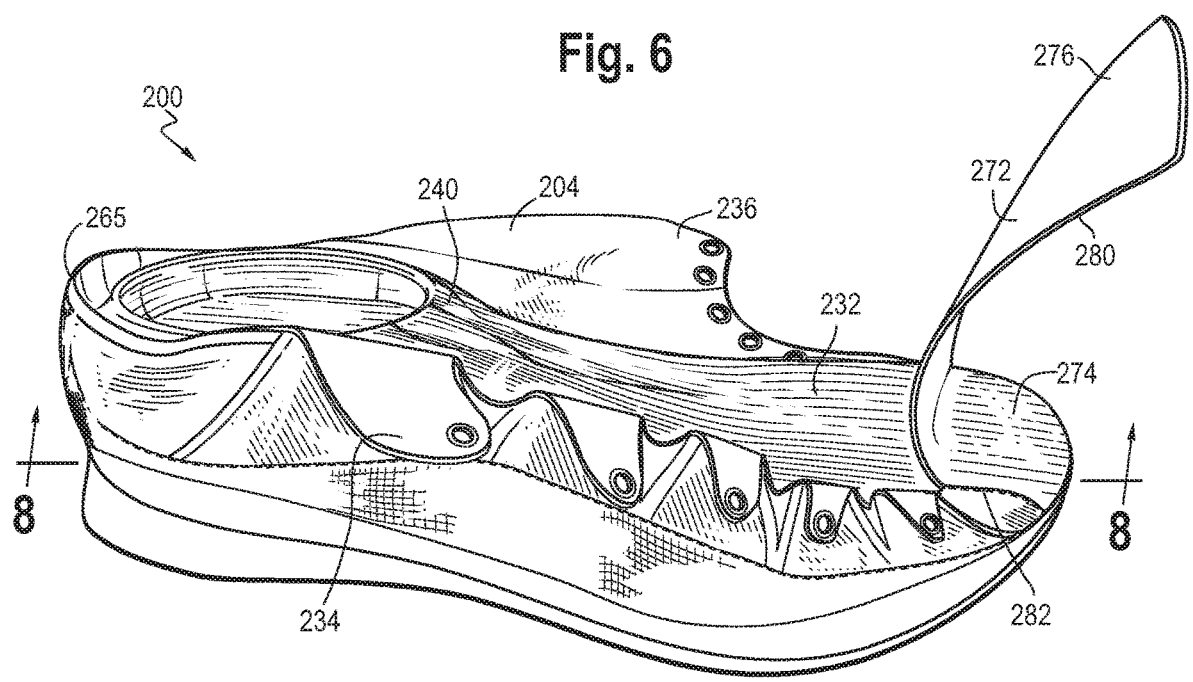
FIG. 6 is an illustration showing a second lateral side view of the article of footwear of FIG. 5, where certain portions of the article of footwear are in a spread or opened configuration to showcase certain features.

FIG. 6 is an illustration showing a second lateral side view of the article of footwear 200 of FIG. 5, where certain portions the second portion 234, the third portion 236, and the forward portion 272 are in a spread or opened configuration to showcase certain features. As shown, the first portion 232, like the first portion 132 of FIGS. 1-4, may be a multi-layer knitted portion where a first layer 240 is located above the foot when the article of footwear 200 is in use. The tongue 276, which is pulled forward in the present view, may overlap the first layer 240 when the article of footwear is worn. The tongue 276 may have edges 280 on its medial and lateral sides that are free and unsecured with respect to the second portion 234 and the third portion 236 of the knitted component 204. In contrast, the toebox area 274 of the forward portion 272 may be secured to the second portion 234 and the third portion 236 via a connection structure 282.

As described in more detail below, the connection structure 282 may be a knitted connection structure (e.g., formed on a knitting machine), and no post-knitting steps may be necessary for connecting the toebox area 274 to the second portion 234 and/or the third portion 236. In other embodiments, the connection structure 282 may incorporate a sewn seam, an adhesive, a mechanical clamp or other fastening device, or any other suitable device or method for securing the toebox area 274 to the second portion 234 and/or the third portion 236. Advantageously, and as described in more detail below, securing the toebox area 274 of the forward portion 272 to at least one of the second portion 234 and the third portion 236 via the connection structure 282 may result in the toebox area 274 curving into a cup-like shape with a cavity. The cavity may form a portion of the void of the article of footwear for receiving a foot. However, it is also contemplated that that the toebox area 274 may be secured only via the front of the first portion 232 such that the toebox area 274 is not directly secured to either of the second portion 234 or the third portion 236.

Figure 7:
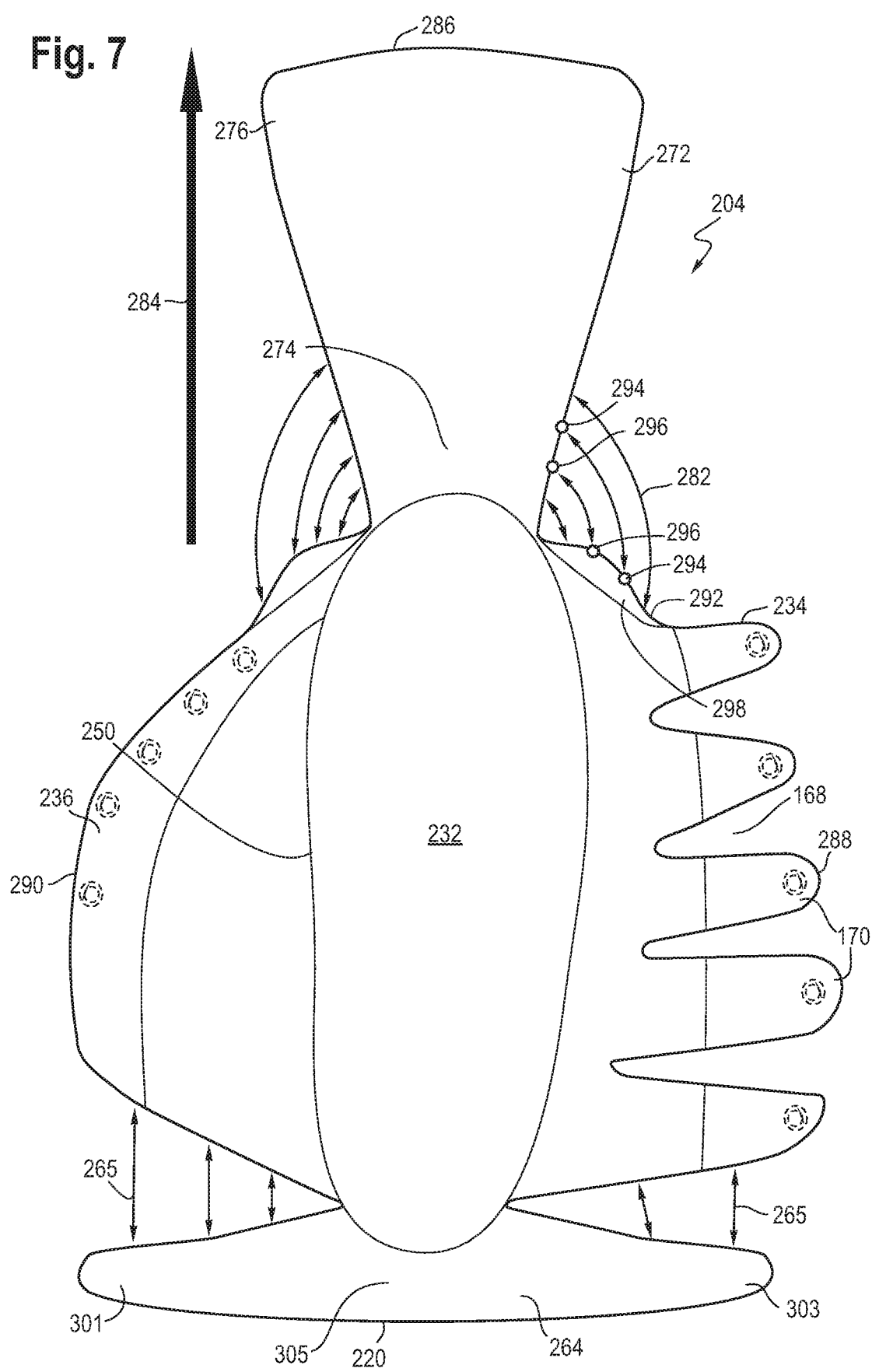
FIG. 7 is an illustration showing a knitting pattern for forming the knitted component for use in the article of footwear of FIGS. 5-6.

FIG. 7 is an illustration showing a knitting pattern for forming the knitted component 204 of FIGS. 5-6. While individual courses are not shown, the courses may extend horizontally from the viewpoint of FIG. 7. The knitting sequence may be performed in the direction depicted by the arrow 284 (such that courses are added to the knitting component in the direction of the arrow 284). The knitted component 204, when being formed, may move against the arrow with respect to the needle beds of a knitting machine. When this direction is used, the heel portion 264 of the knitted component 204 may be formed first, and a collar 220 of the heel portion 264 may be at least partially formed by approximately the first formed course of the knitted component 204. The end 286 of the tongue 276 may be formed by the last course of the knitted component 204.

Since the course-wise direction may be horizontal from the viewpoint of FIG. 7, certain courses may extend from an outer lateral edge 288 of the second portion 234, through the first portion 232, and to an outer medial edge 290 of the third portion 236. When the first portion 232 includes multiple layers, the multiple layers may converge and be secured together at the boundary 250. Thus, the second portion 234 may extend from the point where the multiple separable layers of the first portion 232 converge (i.e., the boundary 250). This may be advantageous since yarns of both the first layer 240 and the second layer 242 (shown in FIG. 6) of the first portion 232 can be incorporated into the second portion 234 and so the second portion 234 may have a rigid, durable, and strong structure formed using the full capacity of two needle beds with all yarns from the relative layers of the first portion 232. The third portion 236 has similar advantages due to its position along lateral side of the boundary 250, which also may be a location where the separable layers of the first portion 232 converge. It is noted that the first portion 232 may not include separable layers in all embodiments.

As describe above, the forward portion 272 of the knitted component 204 may secure to the second portion 234 and/or the third portion 236 via a connection structure 282 (which is represented by the depicted arrows in FIG. 7). The connection structure 282 may be formed using a technique where, as the knitting pattern narrows, the knitting machine holds outer loops on needles of a needle bed for a certain number of courses until the pattern again widens. Specifically, referring to the edge 292 along the second portion 234 of FIG. 7, the loops of the courses defining the second portion 234 along the edge 292 may be formed during formation of the second portion 234 and then held for a series of consecutive passes/courses as the knitting machine continues to knit. Similarly the edge 292 of the third portion 236 may have loops that are held during the formation of additional courses of the first portion 232. As the pattern continues to narrow, more courses may be held.

In the example shown, when the knitting machine reaches the end of the first portion 232 and begins knitting the forward portion 272, the held loops may be re-incorporated into new courses when forming the forward portion 272 and as the knitting pattern widens. In some instances, the held loops may be transferred inward (or outward) such that the placement of the held loops on the needle bed matches their location of incorporated into a new course (which may be determined by a knitting program). For example, the loops of the edge 292 may incrementally be transferred between beds and inward/outward until the location of the loops matches the width of the knitting pattern at its respective position of the forward portion 272.

The order of re-incorporation of loops may be inverted with respect to the order that those loops are initially formed. To illustrate, a first loop 294 on the edge 292 may be initially formed before a second loop 296 on the edge 292 when knitting the second portion 234 of the knitted component 204. However, the second loop 296 may be incorporated into a course of the forward portion 272 prior to the first loop 294 being incorporated into a course of the forward portion 272. As a result, the forward portion 272 may curve into a cup-like shape in the toe area of the knitted component 204 as it is pulled back towards the throat area of the knitted component due to tension in the courses of the forward portion 272, the second portion 234 and/or the third portion 236. In other words, the toebox area 274 of the forward portion 272 may be curved such that a cavity is formed between the toebox area 274 and the underfoot area (defined by at least one layer of the first portion 232), and where the cavity at least partially defines a void for the article of footwear (shown in FIG. 8).

The loops that are held for at least one course and then reincorporated into new, later-formed course may form the connection structure 282. The connection structure 282 may be fully formed on the knitting machine (without requiring post-knitting securement between the second portion 234 and/or the third portion 236). Once the pattern reaches the tongue 276 of the forward portion 272, the courses of the forward portion 272 may continue to knit the tongue 276 having two free edges that may define discrete sides of the tongue 276.

Incorporation of the loops from the edge 292 into the forward portion 272 may require the forward portion 272 and/or the second portion 234 to include a knit structure that is less than full gauge (at least adjacent to the connection structure 282) such that enough needles area available to form the connection structure 282. For example, a least a portion of the forward portion 272 may have a single jersey knit structure, a half-gauge knit structure (or any other gauge less than full-gauge), or any other suitable knit structure. Alternatively (or additionally), the second portion 234 and/or the third portion 236 may have a single jersey knit structure, a half-gauge knit structure, or any other suitable knit structure adjacent to the connection structure 282. In one particular example, the depicted edge region 298 of the second portion 234 may include a single jersey knit structure while the remainders of the second portion 234 and the third portion 236 include one or more double jersey structures. The third portion 236 may include a similar structure.

The heel portion 264 may be secured to at least one of the second portion 234 and the third portion 236. For example, a medial extension 301 of the heel portion 264 may include courses with loops that are held on the knitting machine until the pattern reaches the second portion 234, and a lateral extension 303 of the heel portion 264 may include courses with loops that are held on the knitting machine until the pattern reaches the third portion 236 (which may form the connection structures 265, also shown in FIG. 5). A base 305 of the heel portion 264 may extend to the first portion 232.

While the pattern of FIG. 7 and the related description illustrates and describes the knitting machine as forming the knitted component in the heel-to-toe direction, the knitting direction may be reversed such that the forward portion 272 is formed first and the heel portion 264 is formed last. Alternatively, it is contemplated that the pattern may be rotated with respect to a needle bed such that the courses are oriented differently than the depicted courses of FIG. 7 (e.g., the courses may extend in the heel-to-toe direction, diagonally, etc.).

Figure 8:
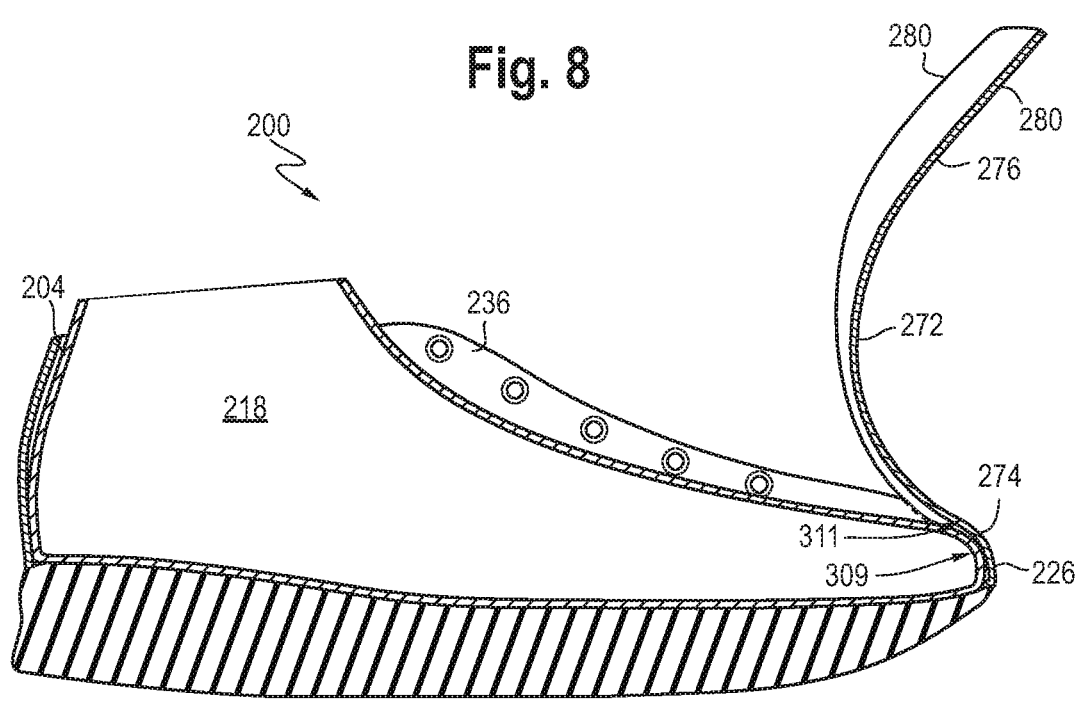
FIG. 8 is an illustration showing a sectional view of the article of footwear of FIG. 6 taken along line 8-8.

FIG. 8 is an illustration showing a sectional view of the article of footwear 200 taken along line 6-6 of FIG. 6. As shown, the toebox area 274 of the forward portion 272 may be curved to form a cavity 309. The cavity 309 may be located in the toe area 226 of the article of footwear 200 and may correspond with a shape of the void 218. In some embodiments, an inner surface 311 of the toebox area 274 may face and form an inner surface of the void 218, particularly when the first portion 232 of the knitted component 204 does not extend above the void 218 (as described below with respect to FIGS. 9-10). As shown in FIG. 8, the tongue 276 of the forward portion 272 have generally free edges 280 that are movable with respect to the second portion 234 (shown in FIG. 6) and the third portion 236.

Figure 9:
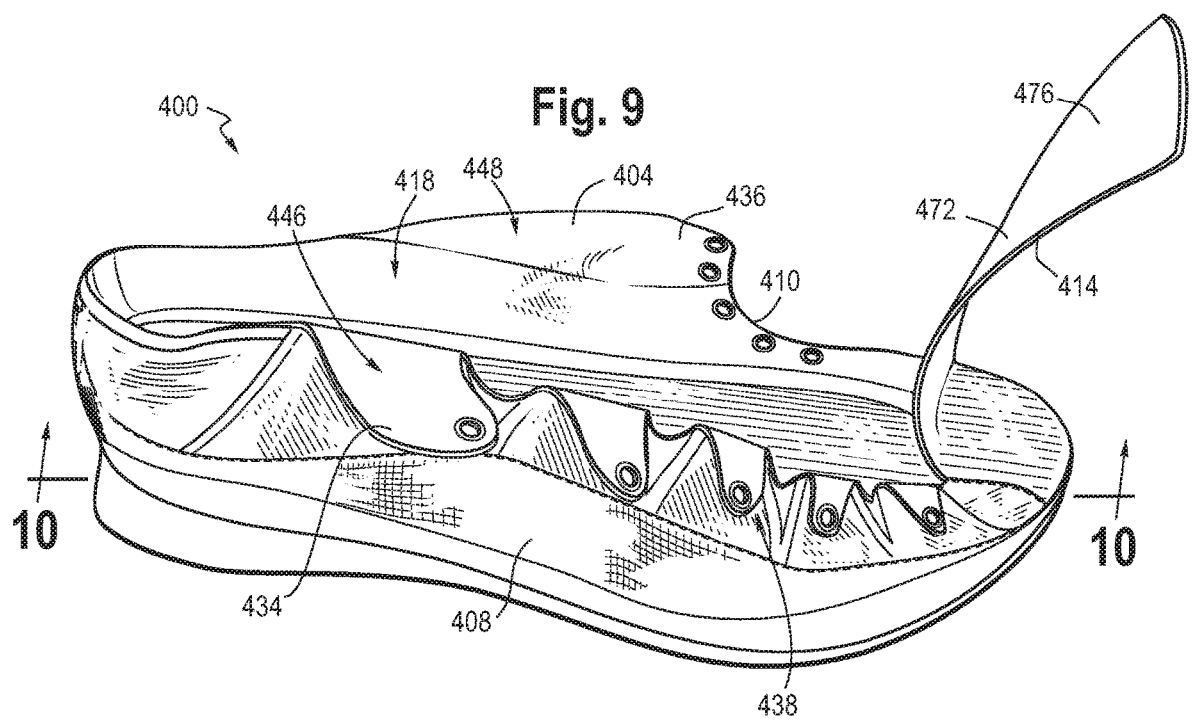
FIG. 9 is an illustration showing a lateral side view of another embodiment of an article of footwear including a knitted component in accordance with the present disclosure.

FIG. 9 is an illustration showing a lateral side view of another embodiment of an article of footwear 400 including a knitted component 404. Like the embodiments above, the embodiment of the knitted component 404 of FIG. 9 includes a first portion 432 located between a second portion 434 and a third portion 436. However, the first portion 432 of the knitted component 404 does not extend to a throat area 414 and remains substantially at an underfoot portion of the knitted component 404. Since the first portion 432 remains located at the underfoot portion of the knitted component 404, the second portion 434 and the third portion 436 may form not only the outer surface 438 on the lateral side 408 and the medial side 410, respectively, but also an inner surface 446 and an inner surface 448 of the knitted component 404 that face and define the void 418 of the article of footwear. The inner surface 446 and the inner surface 448 may be the inner-most surfaces (or at least the inner-most knit surface) with respect to the void 418 at their respective locations, and they may be configured to contract a foot (or sock) of a wearer when the article of footwear is in use. It is contemplated that the inner surface 446 and/or the inner surface 448 may be formed with particular surface characteristics designed for comfort (e.g., a particular softness, anti-abrasiveness, etc.), for example by utilizing a polyester yarn. Since two needle beds may be used to for the second portion 434 and the third portion 436, the outer surface 438 formed by the second portion 434 and/or the outer surface 438 formed by the third portion 436 may have surface characteristics that are better suited for outward-exposure (e.g., for protection of the foot, for anti-abrasiveness and durability, for waterproofing, etc.).

When a forward portion 472 with a tongue 476 is included, the tongue 476 may also (or alternatively) define the inner surface facing the void 418 and may at least partially form the throat area 414 of the knitted component 404. However, the tongue 476 is optional. In embodiments without a tongue, the second portion 434 of the knitted component 404 and the third portion 436 of the knitted component may approach one another and may potentially overlap during normal use such that substantially all of a user's foot is covered by the knitted component 404. In other embodiments, portions of the user's foot may remain uncovered (e.g., when the article of footwear is a sandal, for example).

In the embodiment of FIG. 9, the first portion 432 may have only one layer or bound multi-layer knit structure (e.g., with a double jersey knit structure for enhanced strength and rigidity). However, at least some areas of the first portion 432 may have separable layers that both form the underfoot portion of the knitted component 404.

Figure 10:
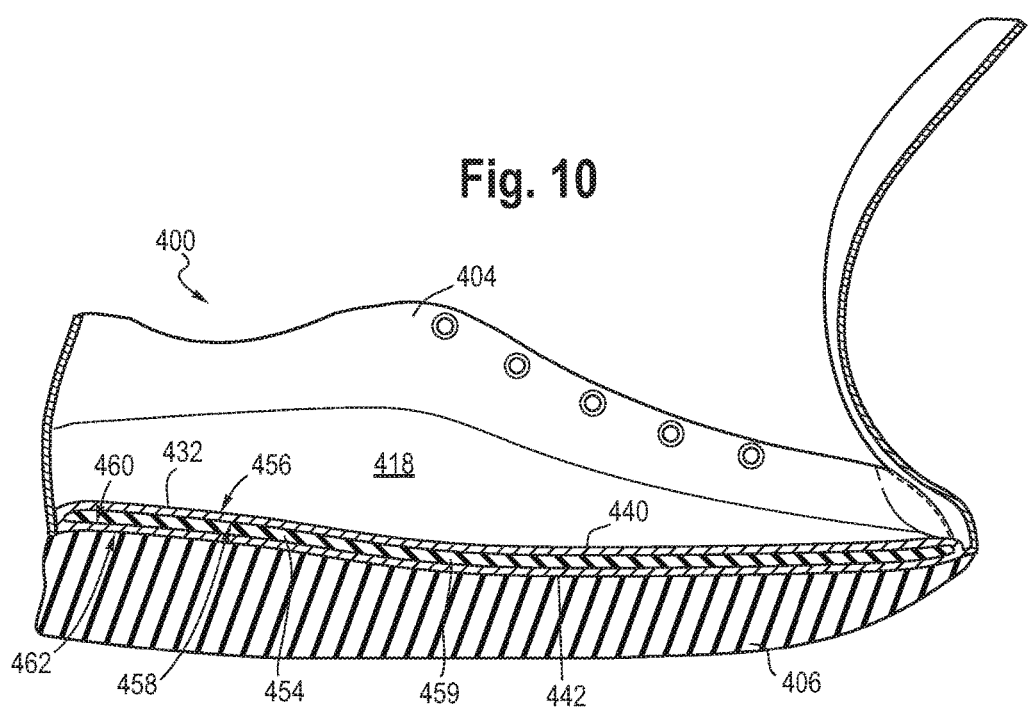
FIG. 10 is an illustration showing a sectional view of the article of footwear of FIG. 9 taken along line 10-10.

Referring to FIG. 10, which is an illustration showing a sectional view of the article of footwear of FIG. 9 taken along line 9-9, the first portion 432 of the knitted component 404 may include a first layer 440 and a second layer 442. The second layer 442 of the first portion 432 may form an underfoot portion of the knitted component that is secured to a sole structure 406 (as described in more detail above). The first layer 440 may also form the underfoot portion, and the first layer 440 may contact the plantar aspect of the foot (also known as the sole or bottom of a foot) during typical use. In other words, both the first layer 440 and the second layer 442 may be located beneath the foot of a user when the article of footwear is in typical use. A first top surface 456 of the first layer 440 may form a bottom surface of a void 418 of the article of footwear. A first bottom surface 458 of the first layer 440 and a second top surface 460 of the second layer 442 may face and define a pocket 454, and a second bottom surface 462 of the second layer 442 may face and secure to the sole structure 406.

The pocket 454 may be sized and shaped to receive a cushioning element 459 (which may be considered a midsole). The cushioning element 459 may be a separate element from the knitted component 404 and may be inserted into the pocket 454 after forming the knitted component 404 on a knitting machine. The cushioning element 459 may include a foam (e.g., a blown foam), an insertable element formed of plastic, metal, rubber, textile material (such as a knitted material), or another suitable material, or any other suitable object for providing cushioning or protection or otherwise attenuate ground reaction forces when compressed between the foot and the ground during walking, running, or other ambulatory activities. The cushioning element 459 may be inserted into the pocket 454 in any suitable manner, such as through an opening formed in one of the layers or at another location of the knitted component 404, by substantially non-invasive injection (e.g., when a blown foam is used), etc. It is contemplated that the cushioning element 459 may be removable and/or insertable after the manufacturing process such that the user (or other person) may select and interchange particular cushioning elements that have particular characteristics beneficial for a certain foot type or size, a particular activity, a desired level of cushioning, etc. Optionally, the cushioning element 459 may be at least partially movable within the pocket relative to at least one of the first bottom surface 458 and the second top surface 460. In other embodiments, the cushioning element 459 may be secured to one or more of the first layer 440 and the second layer 442 via an adhesive, sewing, or any other suitable device or method.

In some embodiments, the cushioning element 459 may be at least partially formed on a knitting machine with the remainder of knitted component 404 such that the cushioning element 459 is considered a portion of the knitted component 404. For example, the cushioning element 459 may include one or more floating yarns formed of a relatively soft material or other material with characteristics that facilitate cushioning and/or protection. One particular example of a cushioning element may include a plurality cushioning structures defined by one or more floating yarns between the first layer 440 and the second layer 442 (see, for example, U.S. Provisional Patent Application No. 62/355,153, filed Jun. 27, 2016, which is herein incorporated by reference in its entirety).

A knitted component formed in accordance with at least some of the embodiments above may be capable of different configuration to form different types of footwear, and/or different types of fit. For example, the knitted component 204 of FIG. 6 and the knitted component 404 of FIG. 9 may have substantially the same knitting pattern even though the knitted component 204 has an additional layer that extends above the foot of a wearer during use (i.e., the first layer 240 of FIG. 6 is primarily located above the void while the first layer 440 of FIG. 9 is primarily located at the underfoot portion). In particular, with reference to FIG. 6 for illustrative purposes, the first layer 240 may be selectively positioned either above or below the void. The positioning of the first layer 240 may be performed during the manufacturing of the article of footwear 200, for example, but after knitting.

Advantageously, a single knitting program may be used to form two or more different types of articles of footwear, which may be reduce machine setup time, programming time, training requirements, and the like. After the knitting process, a post-knitting manufacturing step may finalize the position of the first layer 240 by, for example, lasting and heat-processing the article of footwear 200 (see, e.g., an example of a last and an associated lasting process is described in in U.S. patent application Ser. No. 12/848,352, filed Aug. 2, 2010, and issued as U.S. Pat. No. 8,595,878, which is herein incorporated by reference in its entirety), securing the first layer 240 to another element (e.g., a cushioning element as described with reference to FIG. 10), cutting the ankle opening (if necessary), and/or any other suitable manufacturing step.

Optionally, the knitted component 204 of FIG. 6 and the knitted component 404 of FIG. 9 may have similar or identical knitting patters and programs, but may utilize different yarn materials. For example, the yarns forming the first layer 240 of FIG. 6 maybe relatively elastic such that the first layer 240 can be stretch over the void, while the first layer 440 of FIG. 9 may be formed of relatively inelastic yarns to provide the underfoot portion of the article of footwear 400 with a suitable degree of strength, rigidity, cushioning, and the like. Thus, during setup, an operator can select particular materials (e.g., yarn types) which may determine the type of footwear formed.

It is contemplated that the selection of the location of the first layer may be performed by a user after the article of footwear 200 is substantially manufactured and sold. For example, the first layer 240 may be manipulated by the user such that it is located above the foot during some activities (e.g., athletic activities where a particular degree of tightness and securement is desired), but may also be manipulated to be located below the foot when the user so desires (e.g., when a looser fit is desired). In some embodiments, the first layer 240 may be water resistant or waterproof, and thus a user may select its position based on environmental conditions during a particular time. The selection of the configuration of the first layer 240 by the user may simply be performed by selecting where to insert the foot (e.g., in the opening of the first layer 240, or on top of the first layer 240).

All of the structures and methods disclosed and claimed herein can be made and executed without undue experimentation in light of the present disclosure. While this invention may be embodied in many different forms, specific aspects of the invention are described herein. The present disclosure is an exemplification of the principles of the invention and is not intended to limit the invention to the particular aspects illustrated. In addition, unless expressly stated to the contrary, use of the term "a" is intended to include "at least one" or "one or more." For example, "a yarn" is intended to include "at least one yarn" or "one or more yarns."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various aspects described herein. It should also be understood that various changes and modifications to the aspects described herein will be apparent to those skilled in the art. Such changes and modifications can be made without departing from the spirit and scope of the invention and without diminishing its intended advantages. It is therefore intended that such changes and modifications be covered by the appended claims.

We claim:

1. A knitted component for an upper for an article of footwear, the knitted component comprising:
   a first portion forming a toe area, a midfoot area, and a heel area of the upper, the first portion having a first layer and a second layer, the first layer forming an overfoot portion of the upper, the second layer at least partially forming an underfoot area of the upper, and the first layer and the second layer forming a void therebetween for receiving a foot, and the first layer and the second layer being secured via a first knit structure of the knitted component at a boundary of the first portion;
   a second portion secured to the first portion at the boundary of the first portion via at least one common knit structure, wherein the second portion at least partially forms an outer surface of a medial side or a lateral side of the article of footwear;
   a forward portion extending from an end of the first portion and secured at the boundary of the first portion via at least one common knit structure with the first portion, wherein the forward portion includes a toebox area in the toe area of the knitted component and a continuously knit tongue extending from the toebox area over a throat area, wherein the forward portion has an edge and the second portion has an edge, the edge of the forward portion and the edge of the second portion converging at the boundary of the first portion in the toe area; and
   a knitted connection structure in the toe area that includes a knit loop securing the edge of the forward portion and the edge of the second portion.

2. The knitted component of claim 1, wherein the second portion includes a first edge region adjacent to the first portion, wherein the first edge region includes a first knit structure, and wherein a second region of the second portion is located adjacent to the first edge region and includes a second knit structure being different than the first knit structure.

3. The knitted component of claim 1, wherein the toe box area of the forward portion is curved such that a cavity is formed between the toe box area and the underfoot area, and wherein the cavity defines a void for the article of footwear.

4. The knitted component of claim 1, wherein at least part of the edge region of the second portion overlaps the tongue.

5. The knitted component of claim 1,
   wherein the second portion forms the outer surface on the lateral side of the article of footwear, the knitted component further comprising:
   a third portion forming the outer surface on the medial side of the article of footwear,
   wherein the toe box area of the first portion is secured to the third portion via a second knitted connection structure.

6. A knitted component, the knitted component comprising:
   a first portion forming a toe area, a midfoot area, and a heel area of the upper, the first portion having a first layer and a second layer, the first layer forming an overfoot portion of the upper, the second layer at least partially forming an underfoot area of an article of the upper, and the first layer and the second layer forming a void therebetween for receiving a foot, and the first layer and the second layer being secured via a first knit structure of the knitted component at a boundary of the first portion;
   a second portion extending from at least one of a medial side and a lateral side of the first portion and secured to the first portion at the boundary of the first portion via at least one common knit structure;
   a forward portion extending from a toe region of the first portion and including a toe box area in the toe region, wherein the forward portion is secured to the first portion at the boundary of the first portion via at least one common knit structure with the first portion, wherein the forward portion includes a continuously knit tongue extending from the toe box area over a throat area, wherein an edge region of the second portion overlaps the tongue; and
   a knitted connection structure directly securing the forward portion to the second portion such that the toe box area curves to form an over foot area of the knitted component.

7. The knitted component of claim 6, wherein the second portion includes a first edge region adjacent to the first portion, wherein the first edge region includes a first knit structure, and wherein a second region of the second portion is located adjacent to the first edge region and includes a second knit structure being different than the first knit structure.

8. The knitted component of claim 6, wherein the toe box area of the forward portion is curved such that a cavity is formed between the toe box area and the underfoot area, wherein the cavity forms a void of an article of footwear.

9. The knitted component of claim 6,
   wherein the second portion forms an outer surface on the lateral side of the article of footwear, the knitted component further comprising:
   a third portion forming the outer surface on the medial side of the article of footwear,
   wherein the toe box area of the forward portion is secured to the third portion via a second knitted connection structure.

* * * * *